United States Patent
Eastep et al.

(10) Patent No.: US 9,477,533 B2
(45) Date of Patent: Oct. 25, 2016

(54) PROGRESS METERS IN PARALLEL COMPUTING

(71) Applicant: Intel Corporation, Santa Clara, CA (US)

(72) Inventors: Jonathan M. Eastep, Portland, OR (US); Ilya Sharapov, San Jose, CA (US); Rob F. Van Der Wijngaart, Sunnyvale, CA (US); Richard J. Greco, West Linn, OR (US); Steve S. Sylvester, Hillsboro, OR (US); David N. Lombard, Rossmoor, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/583,254

(22) Filed: Dec. 26, 2014

(65) Prior Publication Data

US 2016/0188380 A1    Jun. 30, 2016

(51) Int. Cl.
*G06F 9/52*  (2006.01)
*G06F 9/50*  (2006.01)

(52) U.S. Cl.
CPC ............. *G06F 9/522* (2013.01); *G06F 9/5094* (2013.01)

(58) Field of Classification Search
CPC ...................................................... G06F 9/52
See application file for complete search history.

(56) References Cited

U.S. PATENT DOCUMENTS

| | | |
|---|---|---|
| 2006/0212868 A1 | 9/2006 | Takayama et al. |
| 2008/0127145 A1 | 5/2008 | So et al. |
| 2011/0055838 A1 | 3/2011 | Moyes |
| 2013/0145379 A1* | 6/2013 | Faraj ..................... G06F 9/522 718/106 |
| 2013/0283277 A1* | 10/2013 | Cai ........................ G06F 1/329 718/102 |
| 2013/0346997 A1 | 12/2013 | Blocksome et al. |
| 2014/0053163 A1 | 2/2014 | Yamauchi et al. |

OTHER PUBLICATIONS

Thread Pools, Sun Microsystems, Inc, 2005.*
Craeynest et al., Fairness-Aware Scheduling on Single-ISA Heterogeneous Multi-Cores, 2013.*
Cai et al., Meeting Points: Using Thread Criticality to Adapt Multicore Hardware to Parallel Regions, 2008.*
International Search Report and Written Opinion received for PCT Patent Application No. PCT/US2015/065761, mailed on Mar. 24, 2016, 10 pages.

* cited by examiner

*Primary Examiner* — Emerson Puente
*Assistant Examiner* — Charlie Sun
(74) *Attorney, Agent, or Firm* — Jordan IP Law, LLC (57) ABSTRACT

Systems and methods may provide a set of cores capable of parallel execution of threads. Each of the cores may run code that is provided with a progress meter that calculates the amount of work remaining to be performed on threads as they run on their respective cores. The data may be collected continuously, and may be used to alter the frequency, speed or other operating characteristic of the cores as well as groups of cores. The progress meters may be annotated into existing code.

25 Claims, 8 Drawing Sheets

PROGRESS METERS IN PARALLEL COMPUTING

TECHNICAL FIELD

Embodiments generally relate to progress meters. More particularly, embodiments relate to progress meters in parallel computing.

BACKGROUND

Computer architectures have grown in complexity from architectures using a single processor to architectures using parallel processors. In addition, High Performance Computing (HPC) may utilize processor groups to handle tasks according to various computational topologies and architectures. For example, an HPC application or job may be divided into various tasks that may be subdivided into groups of related subtasks, commonly referred to as threads, which may be run in parallel on a computational resource. In some architectures, related threads may be processed in parallel and completion of a task may require the completion of all related parallel threads that make up the task.

Computational efficiency may be enhanced by allowing parallel threads to be completed and/or to reach a milestone (e.g., a synchronization point, a global synchronization barrier, or more simply, a barrier) before progressing for further processing (if not already totally completed). Generally, individual threads may perform independent computations before they reach a synchronization point. The threads may complete their work at different times, however, due to variability of computational work among various kinds of tasks, differences that may arise in computational conditions, and so on. Thus, there may be a load imbalance among the computational resources employed, with some threads waiting for other threads to complete. The load imbalance may lead to inefficiencies in performance and power utilization, since computational resources may be idle while waiting for remaining tasks to be completed.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Computational resources may be considered, and/or grouped together, in a variety of different levels, according to a number of different taxonomies, and so on. For example, there may be a single processor having a single core at an atomic level. Above the atomic level, there may be processors including multiple cores. A node may refer to an individual computer including at least one processor and a network connection, and/or multiple processors each including multiple cores. In one example, a node may include 16 multi-core processors. At a higher level, a group of nodes may be grouped together. For example, two or more nodes may be arranged in a cabinet (e.g., a rack), wherein two or more cabinets may be arranged in rows of cabinets. In addition, groups between approximately 1,000 to 10,000 (and more) nodes may be connected together to form an individual cluster, wherein clusters may be connected to other clusters, and wherein groups of clusters may form grids.

In HPC, nodes that comprise an individual cluster and/or a plurality of clusters may be co-located in a common facility. Generally, a common facility may be served by a common power system. Clusters and/or nodes that are co-located together in a common facility may be connected to one another by a relatively low latency, high bandwidth fabric. In addition, communications among remote clusters and/or nodes may be accomplished using a network having relatively higher latency and substantially lower bandwidth (e.g., the Internet). Moreover, an HPC system may be homogenous. For example, hardware that comprises nodes may be built to a common specification. Also, nodes of an HPC system may share a common file system Each level (e.g., core, processor, node, cabinet, cluster, grid, etc.) may refer to a computational resource. In parallel processing, multiple computational resources may be used in a solution of a problem. Although portions of the following discussion may include cores for illustration, embodiments presented herein may utilize computer resources at a variety of levels (computational resources), including processors, nodes, cabinets, clusters, grids, etc., or any combination thereof Generally in HPC, an application may refer to a "job" and a job may include a number of tasks that may be broken down into individual subtasks, which may be referred to as "threads." In parallel computing, a task may be broken down into a related group of independent threads that may be ran concurrently in parallel with one another, wherein each thread may run on a separate core within a node. The threads that collectively make up a given task may run on the cores or processors within a given node. The threads of a given task may run on multiple processors within a node when, for example, the processors share the same coherent memory space. In addition, the threads of more than one task may be ran on a given node based on, for example, a number of microprocessors and/or cores in the node, a workflow being presented, and so on. Additional architectures may permit variations. For example, in some variants, multiple threads may share a common core through various forms of multiplexing.

In parallel processing, code that is to be processed in a parallel fashion may break into individual instances (copies) of itself. Instances may refer to a "rank" in one form of parallel processing that uses a programming model based on a communication library and a runtime called Message Passing Interface (MPI).

A thread may represent a series of work assigned to the thread, or simply "work." Generally, a first set of work undertaken in a thread may need to be completed before remaining work in a thread may begin. The work undertaken by a parallel group of threads within a task may be completed when all of the threads in the parallel group of threads have reached a common milestone in terms of the work that the group has completed. Commonly, it may not be desirable for a new task to commence before the processing of a previous task, of relevance to the new task, has completed. One approach to preventing such a situation from arising is to provide a barrier for the individual parallel threads to reach, wherein the parallel threads have each completed a certain defined amount of work allotted to them at the point represented by the barrier. In this regard, the threads may be in a state of synchronicity with one another. Barriers may be scheduled in time (e.g., occurring with a particular frequency) and/or may be event-based, occurring when the threads complete some amount of work that is computed and assigned at initialization and/or when a previous barrier was reached. The provision of barriers may refer to barrier synchronization, and the barrier may refer to a synchronization barrier, or simply, a "barrier."

Parallel processing may utilize synchronization barriers as global barriers, at which all related threads pause until each of the threads (e.g., processing each on its respective core) have completed the work that has been assigned to each of the threads. Again, and depending on the architecture, global barriers may be time-based and/or may be event-based.

Ideally, all threads would arrive at a given barrier (e.g., a global barrier) at the same time. Generally, threads that make up a task may take different times to complete, even when the computational resources employed appear to be identical (e.g., when cores have been designed to a common specification), and even when the problem has been broken down in what appears to be equal sized portions (e.g., in a large sort, wherein each node may be given a fixed, equal fraction of the data to sort). There may be a number of causes for such variations. Commonly, the causes may be characterized as being "static" or they may be characterized as being "dynamic." In the static case, the cause may be more or less invariant over time, whereas some variability in an operating characteristic arises over time in the dynamic case.

One source of static variability may include as-manufactured variability of hardware. Even though every processor may nominally be identical to every other processor, manufacturing processes may admit some variation in processor qualities, such as processor frequency, speed, and so on.

Examples of dynamic sources of variability include Input/Output (I/O) interrupts from the Operating System (OS), which may slow down a processor. Wake up times, for example due to I/O calls, may vary over time as well, as may a frequency and/or a moment at which a node may be interrupted by an OS. Memory accesses that are made by tasks executing on processors may require varying amounts of time to service, depending on the task. Additional sources of variability may include jitter effects, for example, from the OS interrupting threads on one core and/or processor differently than other threads to perform OS duties such as, e.g., updating a clock, running system software to support an application, and so on. Another dynamic source of variability may be from recoverable hardware errors occurring differently from one node to another node.

Still other sources of variability may be from the nature of a job being processed. For example, task may not divide evenly among resources, either at the software level, or in terms of allocation of hardware (e.g. processors, nodes, etc.) to the job and/or tasks.

Whatever the sources of variability, addressing variability consequences may require that cores tasked with processing a related set of threads wait at periodically placed global synchronization barriers (or simply "barriers").

Figure 1:
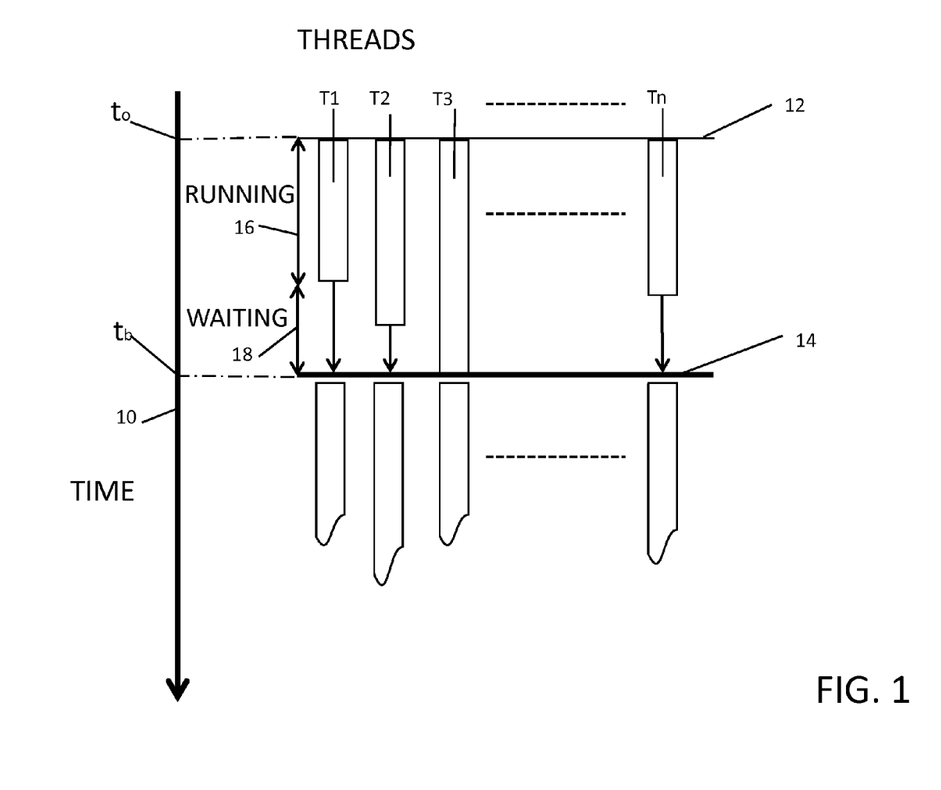
FIG. 1 is a schematic diagram of an example of variations generated in parallel processing of a group of threads.

Turning now to FIG. 1, an example of waiting times that may occur between a first global synchronization barrier 12 and a subsequent global synchronization barrier 14 is shown. A series of threads T1, T2, T3 . . . , Tn (T1 to Tn), which may correspond to a set of related subtasks of a task, begin to be processed at an initial time $t_o$ marked on a time scale 10. The length of bars representing each of the threads T1 to Tn corresponds to a duration during which the threads may undergo processing by their respective cores and/or processors within a given node. For example, the thread T1 may include an active period of processing and/or running time 16, followed by a waiting time 18 during which its core waits for the other threads T2, T3, . . . Tn that are processing in other cores to complete their assigned work and thereby catch up to the thread T1.

Each of the threads T1 to Tn may be referred to as active when undergoing processing on its respective core for a respective period of running time 16 as the work allotted to the threads T1 to Tn is accomplished. It should be understood that active periods, i.e., respective periods of running times 16 associated with each of the n threads, may vary with respect to one another. In FIG. 1, the thread T1 takes the least amount of time to complete (e.g., finish) and the thread T3 taking the longest amount of time to complete (e.g., finish).

A global synchronization barrier 14 may be provided, wherein further processing of threads on cores may be held back (e.g., paused) until the slowest of the threads has completed processing on its respective core. As discussed above, the synchronization barrier may be event-based, and/or it may be time-based. In addition, a spacing of barriers may be fixed and/or may vary. Moreover, barriers may arise throughout the life of a thread. In addition, variation in running times 16 may result in variations in waiting times 18 for each of the cores, during which some threads may be idle and/or their respective cores may not be processing threads. Thus, waiting times may entail idling, which may be wasteful of hardware resources.

It may be possible to reduce the total waiting times by reallocating computational resources (e.g. a number of cores, processors, nodes, etc., at work on a task). In some embodiments, waiting times at a core level may be reduced overall by speeding up slower cores while slowing down faster cores to allow threads and/or cores to arrive at a global synchronization barrier in relatively less mean time. In one embodiment, speed control over a core may include changing an operating frequency of cores, wherein the operating frequency may determine the speed of the core in processing threads under some circumstances and under some metrics. Core frequency may scale with an amount of power provided to the core. In addition, power may scale with a square of the voltage supplied to the core.

In one embodiment, scaling may be leveraged by obtaining information concerning a speed with which threads complete their work before the threads' next global synchronization barrier, and using that information to affect the speed of the cores by adjusting an amount of power provided to the cores. Although the use of scaling is discussed with respect to a core as a computational resource, a similar approach may be undertaken with respect to aggregates of cores, processors, nodes, cabinets, clusters, grids, etc., to allow aggregates of cores to run relatively more efficiently in terms of power and/or time.

Information concerning a speed with which threads may complete their work may be provided by a series of progress meters. In some embodiments, progress meters may be provided as part of the code that is run on the cores. The progress meters may compute an amount of work that a thread is to complete before a next synchronization global barrier. Then, at intervals thereafter (either periodic or not), the progress meters may compute an amount of work remaining until the next global synchronization barrier is reached. Information on the progress of threads may be subsequently used to control a frequency (e.g., speed) of cores and/or an allocation of computer resources.

Figure 2:
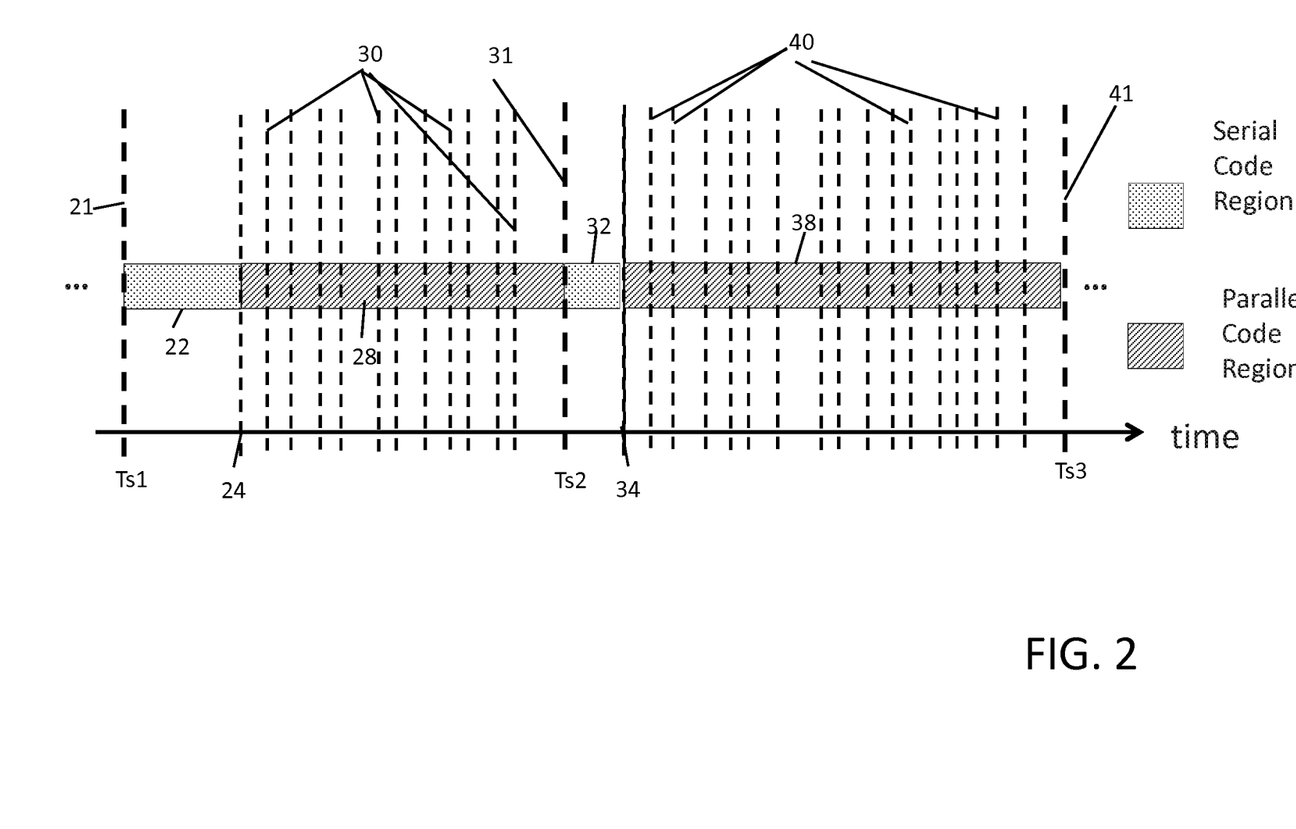
FIG. 2 is a schematic diagram of an example of a time-line to process a thread according to an embodiment.

FIG. 2 shows an example of an embodiment in which a progress meter may be used to track progress of a single thread executing on a single core. At a time Ts1, a first global synchronization barrier 21 marks a start of processing and a thread globally synchronizes with other related threads across respective cores of the threads. In one example, the processing begins with a serial code region 22 in which threads may be processed serially. At time 24, the thread arrives at a parallel code region 28, at which point a progress meter (which may be imbedded into the parallel code) computes the total work to be done in processing the thread from start to completion prior to reaching a next global synchronization barrier. Although FIG. 2 depicts a serial code region 22 preceding a parallel code region 28, in other embodiments the serial code region 22 may follow or be interleaved with the parallel code region 28. Indeed, there may be multiple serial and parallel code regions between barriers.

At subsequent times 30, the progress meter computes a percent of total work remaining and/or completed at the particular point in time (i.e., a "work fraction") and shares the work fraction with other system assets, discussed below. At time Ts2, a second synchronization barrier 31 may be provided, followed by a serial code region 32. A new calculation of an amount of work to be done may occur at time 34 for further processing of the thread (e.g., if the thread has not already completely completed or been discarded) as the thread enters the next parallel code region 38. At subsequent times 40, a percent of total work remaining and/or completed at the particular point in time (i.e., the work fraction) may again be calculated, and the work fraction may be shared with other system assets, discussed below. In addition, the thread continues and reaches a next synchronization barrier 41 at time Ts3. The process repeats for each thread in a group of threads until the overall job represented by the group of threads has been completed.

Figure 3:
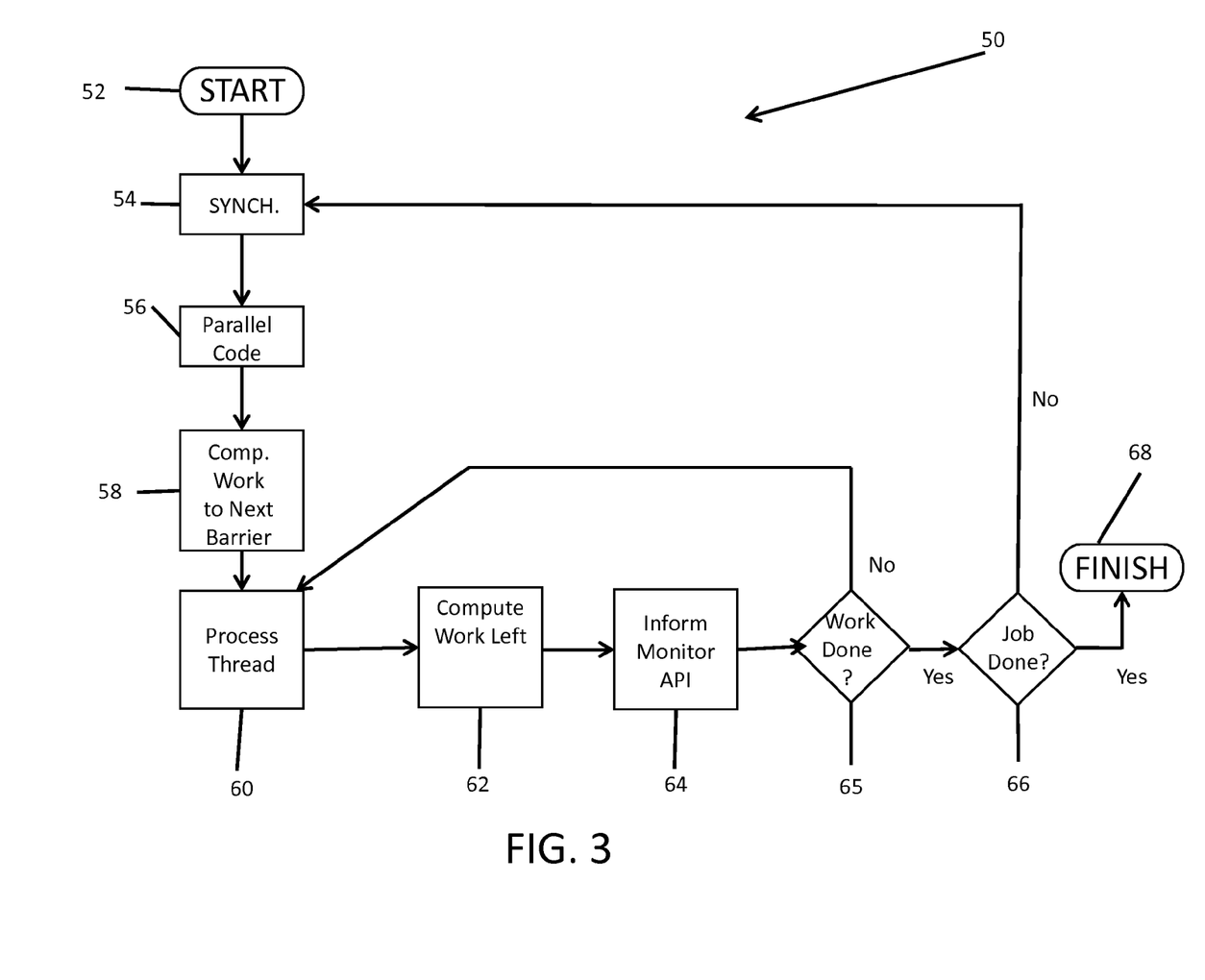
FIG. 3 is a flowchart of an example of a method of using progress meters according to an embodiment.

Turning now to FIG. 3, a flowchart of an example of a method 50 in which progress meters in software may be used to track a completion of a thread in a node is shown according to an embodiment. The method 50 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 50 may be written in any combination of one or more programming languages, including an object oriented programming language such as C++ or the like and conventional procedural programming languages, such as the "C" programming language or similar programming languages.

Moreover, the method 50 may be implemented using any of the herein mentioned circuit technologies.

A job may start at block 52. At illustrated processing block 54, a core and the core's attendant thread may be globally synchronized with respect to other related threads and cores, giving the threads a common starting time. After executing any serial code that may be present, the thread encounters a parallel code region at illustrated processing block 56. At illustrated processing block 58, a progress meter calculates an amount of work that is to be processed before the thread encounters a barrier. At illustrated processing block 60, the code may be executed, for some period at the end of which illustrated processing block 62 computes how much work, either in absolute terms or as a fractional representation thereof (e.g., as a percentage), remains to be done on the thread. Information regarding remaining work is shared with a monitor Application Processing Interface (API) at illustrated processing block 64. Block 65 determines if the thread has completed (i.e., if all of the work to be done in the thread has been done). If the work has not been completed, then control passes back to the processing block 60, wherein additional processing occurs. If the block 65 determines that the work has completed, then illustrated processing block 66 determines if the overall job has been completed. If so, then the process ends at block 68. On the other hand, if there are additional threads for the core to process, then control passes back to the processing block 54 for another synchronization.

Progress meters offer a possibility of providing multiple evaluations of work remaining in a thread, and thus offer information that may be utilized to alter work flow in approaches that are relatively more efficient users of resources, including time and computational resources. Jobs may then be completed relatively sooner than in conventional approaches.

Progress meters may be implemented in software. In one embodiment, the implementation may be as a software probe that may be inserted into existing code. Such a probe may be referred to as a call statement which when encountered calculates work to be done in processing a thread on its initial encounter, and then calculates a fraction of that work remaining to be done for the thread in subsequent encounters.

Figure 4:
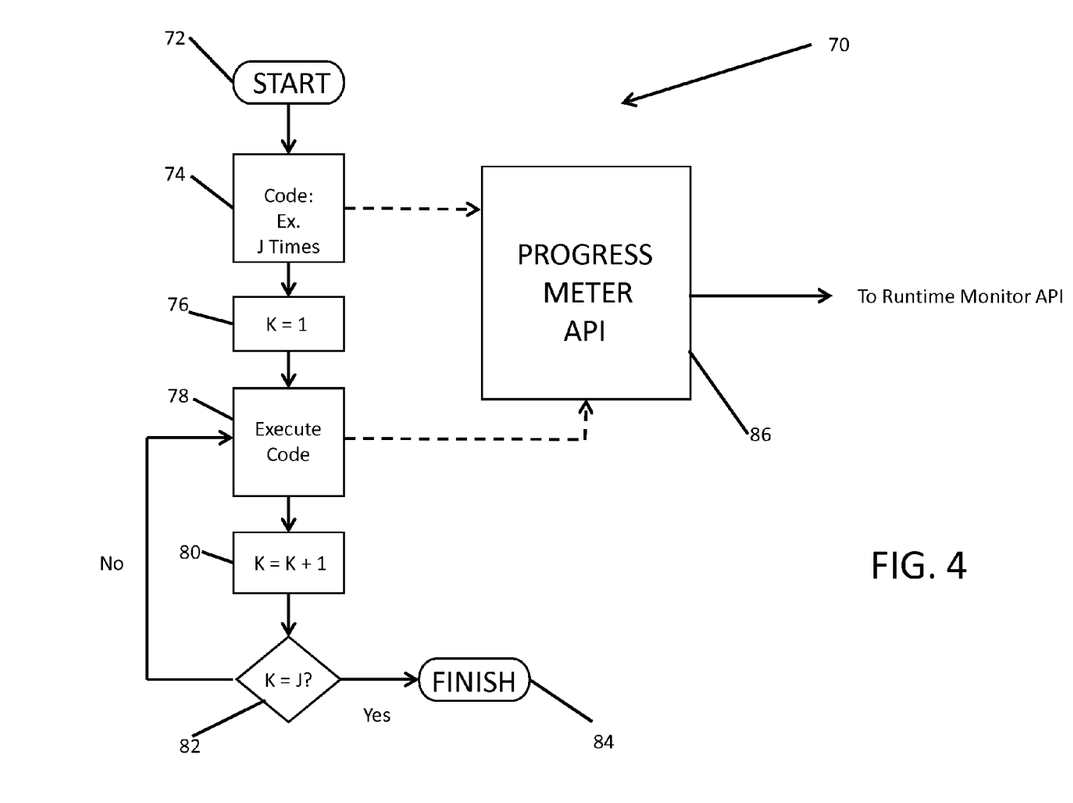
FIG. 4 is a flowchart of an example of a method of using progress meters in software according to an embodiment.

FIG. 4 shows an example 70 of an embodiment of a software implementation of a progress meter, which illustrates an annotation of pre-existing code with a progress meter. In the example 70, the pre-existing code that begins at block 72 is a simple loop. At illustrated processing block 74, the software may be passed a parameter indicating that it is to be executed J times. A variable K may be employed as a counter for tracking the number of passes through the code, and initialized to an integer 1 at illustrated processing block 76. The code may be executed at illustrated processing block 78, and the variable K may be incremented at illustrated processing block 80. Block 82 determines if K=J. If K does not equal J, then control loops back to the processing block 78. If the block 82 determines that K=J, then the code may finish running at illustrated processing block 84.

A progress meter 86 may be provided in the form of an API that may be inserted into or in parallel with existing code as in FIG. 4. The progress meter 86 may be passed the value of J and it may track the number of loops that have been made and/or are yet to be made through the code. Access to the code that is to be executed, along with both the number of iterations through the code that have been made (e.g., K) and the number of iterations that are to be made (e.g., J) may provide a measure of progress made at a level of each iteration through the loop. For example, if J=10, then when K=1 it may be determined that 10% of work on a thread has been completed. In another example when K=8, it may be determined that 80% of work has been completed. Alternatively, these numbers may be expressed as percentage of work that remains to be completed (e.g., in the first example, 90% of the work remains to be done, and in the second example, 20% of the work remains to be done). The progress meter 86 may pass numbers indicating the amount of work completed and/or to be completed to a runtime monitor API, discussed below, to affect the processing of the threads.

In other embodiments, a progress meter may determine total work and/or percent work completed automatically through dynamic code profiling and/or analysis of processor performance counters. In addition, an application may not pass other information to a progress meter.

A progress meter may compute work and/or work percentages either on a time-based scale (i.e., having a certain number of occurrences/unit time, or frequency), or the progress meter may be event based (e.g., making a computation each time through a loop regardless of time, such as is the case in the example in FIG. 4, discussed above. In one embodiment, a progress meter may update approximately once every 10 micro-seconds. Faster updating may be employed. If updates are computed relatively frequently, and the progress meter is inserted into the application code serially (and not in parallel with it), overhead and/or application performance may be balanced and/or considered.

Figure 5:
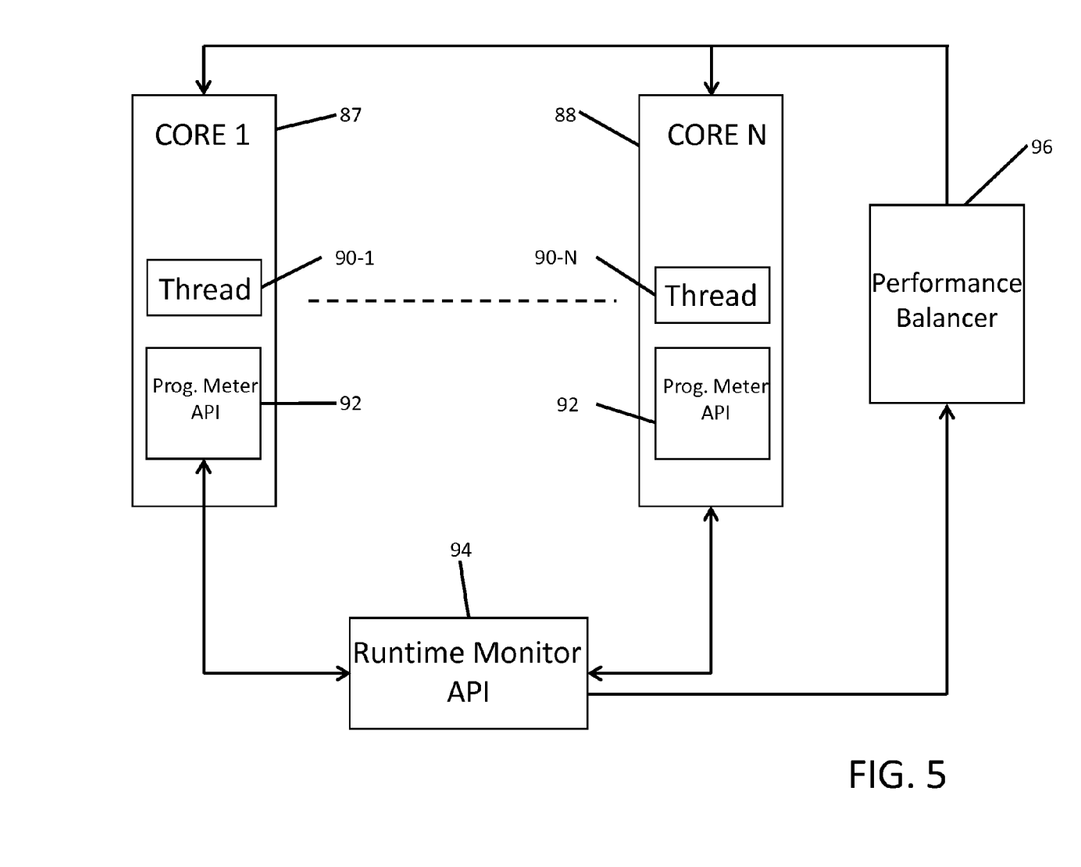
FIG. 5 is a block diagram of an example of a system to use progress meters according to an embodiment.

Turning now to FIG. 5, a block diagram of an example of a system to utilize progress meters is shown according to an embodiment. In one example, computational resources may include cores. For example, a group of cores may be provided including a first core 87 and an Nth core 88. Each of the cores 87 . . . 88 may run a thread 90-1 . . . 90-N that may be an instance of parallel code, which may be identical from core to core. Each core 87 . . . 88 may be provided with a progress meter 92. In one example, the progress meters 92 of each of the cores 87 . . . 88 may notify a runtime monitor 94 (which may itself be an API) of the progress being made on a thread via explicit function calls. Alternatively, the progress meters 92 of each of the cores 87 . . . 88 may update progress values that may be queried by the runtime monitor 94. The runtime monitor 94 may be a part of the OS, a stand-alone program, or a part of a relatively comprehensive performance/power optimization framework that combines multiple optimization techniques.

At a first global synchronization point, the progress meters 92 of each of the cores 87 . . . 88 report the total amount and/or percentage of work that is to be completed with respect to a given thread from start to completion. Then, at subsequent intervals, the progress meters 92 of each of the cores 87 . . . 88 report a fraction of work remaining (and/or already completed—the work fraction). The runtime monitor 94 forwards the work fraction to a performance balancer 96, which may use the information provided by the progress meters 92 to modify a frequency of each of the cores 87 . . . 88, and/or otherwise affect an allocation of resources applied at the core level.

The information provided by the progress meters 92 of each of the cores 87 . . . 88 may be used in a number of ways. In the event that a thread traverses a given core at a slower speed than other threads are traversing respective cores, the slower core may be sped up and/or the faster core slowed down by varying respective frequencies of the cores. One way to affect such control is by reallocating power from the faster cores to the slower cores. Similarly, adjustments to the power supplied to cores or other adjustments to the cores that affect their operating frequency, may, in the aggregate, also modify the speed of their respective nodes and aggregates of nodes.

Thus, core (and/or processor) frequency may be varied over a range by altering the amount of power that may be fed to the core (and/or processor). In a situation where power resources may be limited, faster thread processing times may be obtained by shifting power away from cores that are faster than the average of the cores employed, and toward cores that are slower than the average of the cores employed. In some circumstances, it may be advantageous to redirect power away from cores that are slower than average to other cores that are even slower. Progress meters provide data that may be used to regularly adjust power to cores, thereby relatively reducing waiting times at synchronization points. In some embodiments, power shifting may also reduce power consumed in the course of processing a given job.

Figure 6:
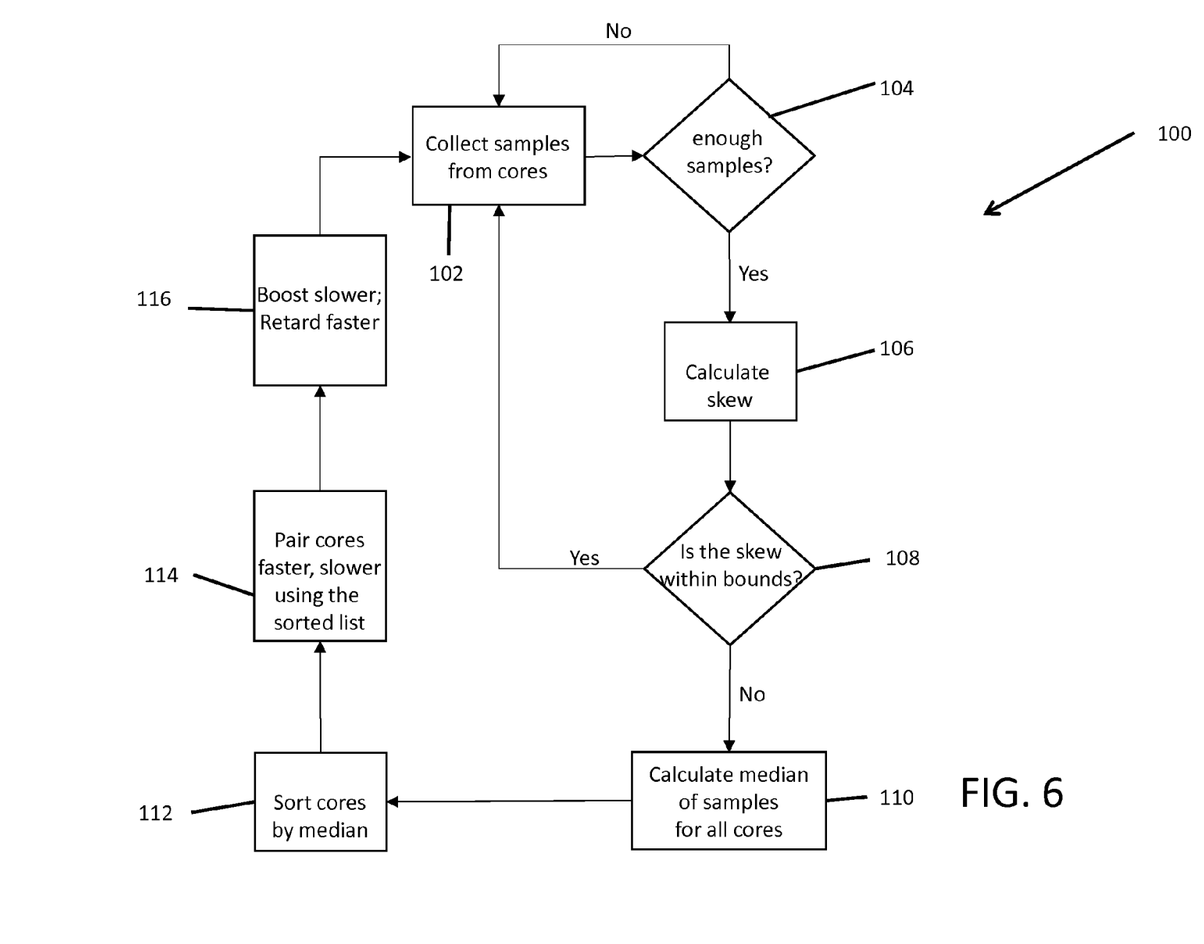
FIG. 6 is a flowchart of an example of a method of using progress meters to vary performance of a core according to an embodiment.

FIG. 6 shows a flowchart of an example of a method 100 of utilizing information provided by progress meters to control the flow of power among the cores in a node. The method 100 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 100 may be written in any combination of one or more programming languages, including an object oriented programming language such as C++ or the like and conventional procedural programming languages, such as the "C" programming language or similar programming languages. Moreover, the method 100 may be implemented using any of the herein mentioned circuit technologies.

Illustrated processing block 102 may collect data from progress meters regarding an amount of work remaining to be performed on related threads at respective cores of the related threads. The data may be stored in vector or matrix form. It may be desired to increase an amount of data collected. Thus, block 104 determines if enough data has been collected. If not, control passes back to the processing block 102. If so, then illustrated processing block 106 calculates numbers provided by the progress meters across the cores. One useful measure may include a skew of the samples collected, where the skew may refer to a variance of the core progress (as determined in the samples) divided by their mean.

When the skew lies within some limit, the operation of the cores may be determined to be efficient in terms of time and/or power resources employed. Thus, block 108 determines if the skew may be within a bound. If so, control loops back to the processing block 102 for another round of data collection. If the skew is outside of a bound set by the limit, then a median of the samples for the cores may be computed at illustrated processing block 110, and the cores may be sorted about the median (e.g., from high to low) at illustrated processing block 112.

Illustrated processing block 114 arranges the cores in pairs, beginning with the fastest core being paired to the slowest core, continuing with the second fastest core being paired to the second slowest core, and so on in round-robin fashion until all cores and/or all cores lying outside of some predetermined band are accounted for. Illustrated processing block 116 steers power within each pair of cores from the faster of the two cores to the slower of the two cores. Such power shifting may slow down the faster cores (e.g., in the pairs) by reducing the operating frequency of the faster cores (e.g., in the pairs), and/or may speed up the slower cores (e.g., in the pairs) by increasing the operating frequency of the slower cores (e.g., in the pairs).

Advantageously, the overall speed with which a parallel processing job is to be completed may be relatively increased. In addition, total amount of power necessary to complete the job may be relatively reduced. Moreover, facilities that house HPC systems generally may require substantial air cooling to account for heat generated at the cores of an HPC system. Thus, reducing the relative power consumed by the cores may result in less heat generated at the cores, which may allow relatively less intensive use of air conditioning systems in HPC facilities to provide additional further power savings.

In an alternative embodiment, the processing block 114 may omitted, and the slowest frequency cores may be boosted at illustrated processing block 116 by, for example, directing that they receive more power, which may be accompanied by reductions in the amount of power provided to the faster cores.

The processing blocks may be implemented in the various combinations of hardware and/or software elements noted above. Thus, in one embodiment processing block 106 may be implemented in hardware and/or software, and may include a skew calculator to compute a skew. It will be appreciated that other implementations of the method are possible.

Figure 7A:
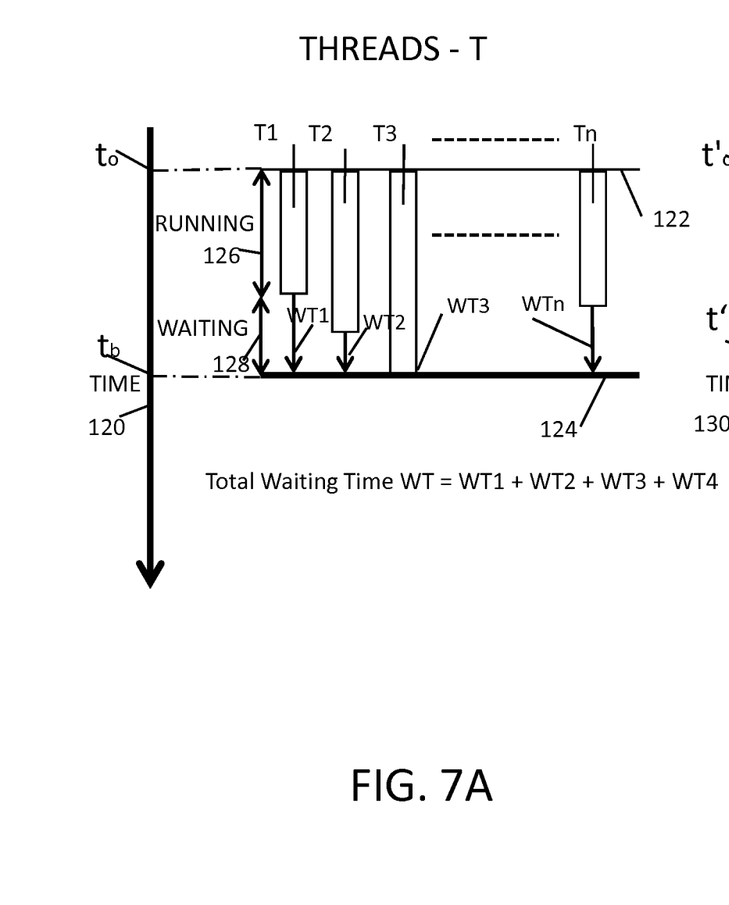
FIGS. 7A-7B are schematic diagrams of examples of variations generated in parallel processing of a group of threads according to an embodiment.
Figure 7B:
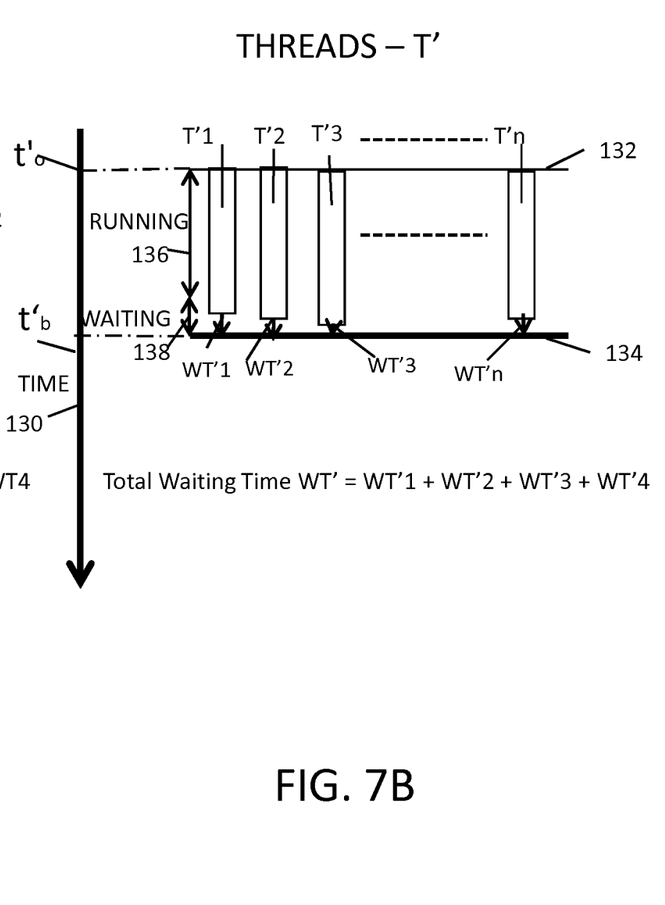

Turning now to FIGS. 7A-7B, several effects of data provided by progress meters to control computational resources, such as cores, is shown according to an embodiment. In one example, core frequencies may be varied (such as by varying the power supplied to the cores). FIG. 7A is similar to FIG. 1, discussed above, and shows a time interval along a timeline 120 between an initialization 122 of a group of threads T1, T2, T3, . . . Tn at a time to and a time $t_b$, at which a subsequent synchronization barrier 124 may be encountered.

Each of the threads T1, T2, T3, . . . Tn may have a respective active running time 126 during which work occurs, and may have a respective waiting time 128 during which work on a thread has completed, and during which the thread and/or the core on which the threads run awaits other threads to complete work on the other threads' respective cores. In the illustrated example, the waiting times of the threads T1, T2, T3, . . . Tn are indicated as WT1, WT2, WT3 . . . WTn, respectively. Some of the waiting times may be 0, and in general some of the waiting times may be longer than others. The sum of the waiting times may be given as:

$$W_{total} = WT1 + WT2 + WT3 + WTn$$

FIG. 7B shows a situation in which one of the embodiments discussed herein is employed to vary a frequency of individual cores, speeding up those that are relatively slow and/or slowing down those that are relatively fast. A time interval is shown along a timeline 130 between an initialization 132 of a group of threads T'1, T'2, T'3 . . . T'n at time $t'_0$ and a time $t'_b$, at which a subsequent synchronization barrier 134 may be encountered. Each of the threads T'1, T'2, T'3 . . . T'n may have an active running time 136 during which work occurs, and may have a waiting time 138 during which work on a thread has completed, and during which the thread and/or the core on which the threads run awaits other threads to complete work on the other threads' respective cores. In the illustrated example, the waiting times of the threads T'1, T'2, T'3 . . . T'n are indicated as WT'1, WT'2, WT'3 . . . WT'n, respectively. Some of the waiting times may be 0, and in general some of the waiting times may be longer than others. The sum of the waiting times may be given as:

$$W'_{total} = WT'1 + WT'2 + WT'3 + WT'n$$

It may be noted that the effect of utilization of progress meters may be to permit a synchronization barrier 134 to be encountered sooner than would be the case as depicted in FIG. 7A. For example:

$$(t_b - t_0) > (t'_b - t'_0)$$

Moreover, the total of the waiting times may be relatively reduced when using data provided by the progress meters:

$$W_{total} > W'_{total}$$

Reductions in waiting times may permit a shortening of intervals between global barriers and may make relatively more efficient use of computational resources in terms of time and/or power used in completing jobs.

Although examples of embodiments set forth here have been presented in terms of cores as the basic unit of computational resource, embodiments may also be applied to other levels of computational resource, including processors, multi-core processors, racks of nodes, cabinets, clusters, grids, and so on. Embodiments at levels above the core, such as nodes, may include aggregating data from the cores of related threads running on a given node.

Figure 8:
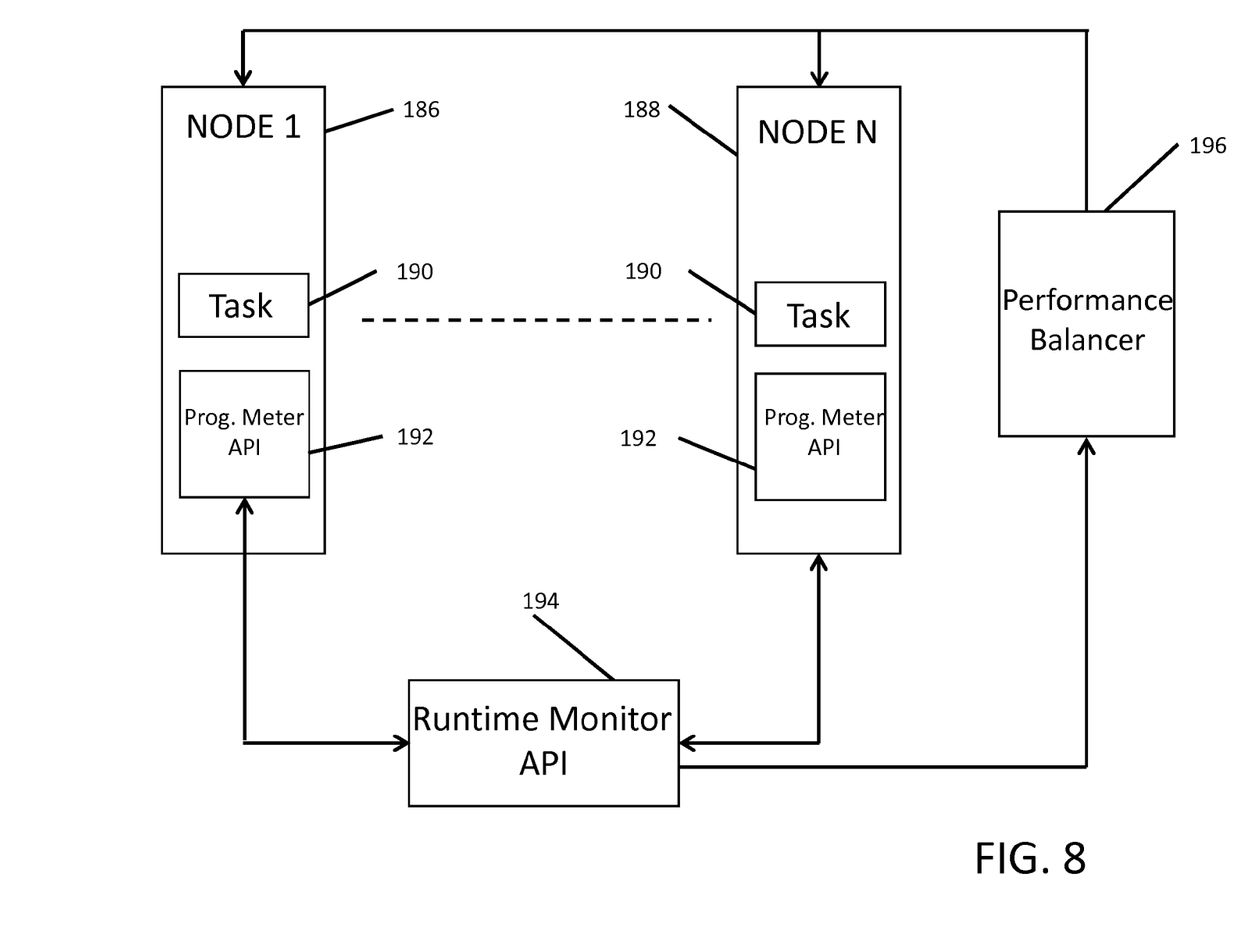
FIG. 8 is a block diagram of an example of a system to use progress meters at a node level according to an embodiment.

FIG. 8 shows a block diagram of an example of a system to use progress meters at a node level (e.g., computational resources are nodes). A group of nodes may be provided including a first node at 186 and an Nth node 188. Each of the nodes 186 . . . 188 may run one or more tasks 190 that may be instances of parallel code, which may be identical for a related group of tasks running within a given node. As before, each task may include a number of related threads, each of which may run on a single core. Each node may include a number of cores on which a number of threads are being processed, each of which may be provided with a progress meter 192 that may report to a runtime monitor 194 (which may be an API) at various times. Thus, embodiments may include aggregations of cores, e.g., nodes.

At the level of nodes, the progress meters 192 of each of the nodes 186 . . . 188 may provide statistical measures based on aggregates for the various threads and/or tasks that are executing in the respective nodes 186 . . . 188. For example, the progress meters 192 of each of the nodes 186 . . . 188 may report an average work completed and/or to be completed across cores in a given node. In another example, the progress meters 192 of each of the nodes 186 . . . 188 may report a number to indicate the least amount of work completed in any one of the cores in a node.

Other statistical measures (e.g., median, variance, standard deviation, skew etc.) of core performance within a given node may be also reported. At subsequent intervals based on time and/or event, the progress meters 192 of each of the nodes 186 . . . 188 may continue to report statistics derived from work completed and/or work assigned to the computational resources (e.g., cores) within each of the respective nodes 186 . . . 188. The runtime monitor 194 forwards the information to a performance balancer 196, which may use the information provided by the progress meters 192 of each of the nodes 186 . . . 188 to modify the allocation of resources applied to the nodes. Additionally, the performance balancer may aggregate the per-thread progress meter information provided regarding individual threads to determine overall node progress.

Adjustment of node power, which may be used to alter node speed, may be accomplished through a variety of mechanisms. For example, a processor may be equipped with software-exposed power capping and monitoring interfaces that a runtime system configures to adjust processor power.

At still higher levels, where it is desired to track progress of individual cabinets, clusters, and/or grids, basic information concerning work progress may continue to be based on per-thread data provided at the core level by the progress meters, discussed above. As one moves to higher levels of computational resource, progress meter data may be progressively aggregated, level by level. For example, when evaluating the speed of nodes, one may consider the slowest thread on any core within a given node, and may use that as a proxy for the speed of the node. Similarly, when considering the progress of aggregations of nodes (e.g., in clusters), one may further aggregate node data by considering the slowest node in a cluster as a proxy for the speed of that cluster. The speed of the slower computational resources (node, cluster, etc.) may then be modified by speeding up the slower performing computational resources, possibly while also slowing down the faster performing computational resources. One way of affecting speed may be by providing more power to slower resources.

In an additional embodiment, the process times for relatively slow processing threads may be decreased by providing the relatively slower threads with additional resources, such as by further dividing the work of a thread and then parceling out the divided thread to additional cores.

Embodiments disclosed herein may mitigate the problem of load imbalance and provide methods to speed up tasks that otherwise might take longer to complete while allowing tasks that otherwise might complete faster to run in a more power efficient regime. Notably, tasks that are running slow may be sped up by being given additional resources. The resources may include additional electrical power provided to processing cores. Such an approach may use metrics of task completion. In embodiments, the metrics may be provided by providing progress meters as annotations to parallel computational regions that indicate a fraction of work between synchronization points a particular thread has performed.

In addition, load balancing may be provided in cases when computational work may not commonly be evenly balanced between parallel tasks and subtasks (threads). Such cases may arise when available computational resources may not divide evenly, or the problem might have some affinity to powers of two or to perfect cubes, but a number of cores may be arbitrary, etc. For irregular problems (graphs, adaptive grids), optimal work balancing may be difficult, and the physical resources at hand may not be evenly divisible by the tasks at hand. Embodiments may provide dynamic balancing among the tasks and threads.

The progress of each task may be expressed in units that are specific to particular applications. For example, in loop-based regions of computations, e.g., as is depicted in FIG. 4, discussed above, which may generally be in HPC applications, progress may be expressed as a fraction of loop iterations performed between synchronizations. A practical advantage of using workload-specific metrics for tracking application progress may include objectively representing completed work independent of code generation or run time conditions.

Using a system-observable metric, such as a count of instructions and/or specific operations, as a proxy for application progress may need to account for a compiler that generates two or more versions of the same code region (vector and scalar, parallel and serial) with one of the versions being picked dynamically at run time based on some condition. Different run time choices may distort application progress monitoring when based on instruction or operation counts. Using workload-specific measures of progress may provide more global consistency across multiple nodes.

In some embodiments, a run-time monitor program may be used to track progress of parallel tasks and identify which tasks are falling behind the slowest value across all tasks in a group. The run-time monitor may then apply additional resource to the lagging tasks to equalize task progress. The additional resources may include an increased power budget for a particular task that may allow corresponding CPU cores to run at higher frequencies, therefore speeding up the progress. In a case of applications parallelized at multiple levels, such as hybrid Message Passing interface (MPI)/Open Multi-Processing (OpenMP) applications, the monitor program may dynamically increase a number of OpenMP threads that are used in a slow running MPI rank. Similarly, the tasks whose progress exceeds that of the rest of tasks in parallel workload may be slowed down by reducing their power allocation and/or an amount of other resources, such as CPU cores, that they use, relatively improving the efficiency of the run without impacting the run time or performance.

In situations where processor speeds are effectively uniform within a given processor type, individual processors may be allocated different amounts of power as a default, with the amount of power allocated being less than what may be used to power the processors at its full speed. For example, two processors that may be nearly identical may tasked with work that may entail the use of different amounts of power. Two processors may require different voltages to achieve correct operation at a given speed, and the power may be enough for one processor to achieve the voltage and not the other processor. Embodiments may be used with such processors to further vary performance in ways that relatively improves the speed of such processors and/or efficiency in parallel processing applications.

Embodiments presented herein may be used both in customer code and in vendor-supplied libraries that may be used across multiple applications. In cases when it may be desired to annotate an entire body of code with progress meters, a partial application of this technique to most frequently used regions of the code may still produce beneficial results.

To the extent various operations or functions are described herein, they may be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface may be configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what may be described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

ADDITIONAL NOTES AND EXAMPLES

Example 1 may include a method of controlling a computational resource, comprising globally synchronizing a plurality of tasks across a plurality of computational resources, computing an amount of work to complete at least one task of the plurality of tasks, processing the plurality of tasks in parallel to accomplish work corresponding to each task of the plurality of tasks, repeatedly computing a work fraction that corresponds to one or more of a fraction of work completed or work remaining to be completed with respect to the amount of work to complete the at least one task of the plurality of task, and modifying a characteristic of at least one computational resource of the plurality of computational resources based on the work fraction.

Example 2 may include the method of Example 1, wherein the plurality of computational resources includes a plurality of cores, and wherein a frequency of at least one core of the plurality of cores is varied based on the work fraction.

Example 3 may include the method of any one of Examples 1 to 2, wherein the plurality of computational resources includes a plurality of processors, and wherein a frequency of at least one core of the plurality of processors is varied based on the work fraction.

Example 4 may include the method of any one of Examples 1 to 3, wherein the plurality of computational resources includes a plurality of nodes, and wherein at least two nodes of the plurality nodes are to process parallel code.

Example 5 may include the method of any one of Examples 1 to 4, wherein the plurality of tasks includes a plurality of threads, and wherein the plurality of computational resources includes a plurality of cores.

Example 6 may include the method of any one of Examples 1 to 5, further including receiving an indication of the work fraction at a runtime monitor.

Example 7 may include the method of any one of Examples 1 to 6, further including modifying one or more of a number, a distribution, a speed, or a frequency of at least one of the plurality of computational resources.

Example 8 may include the method of any one of Examples 1 to 7, wherein the characteristic includes a speed, and wherein the speed of at least one computational resource of the plurality of computational resources is modified by changing an amount of electrical power provided to the at least one computational resource.

Example 9 may include the method of any one of Examples 1 to 8, wherein the plurality of computational resources includes one or more of a core, a processor, a multi-core processor, a node, a cabinet, a cluster, a row, or a grid.

Example 10 may include the method of any one of Examples 1 to 9, wherein the plurality of computational resources includes a first computational resource, at least one set of second computational resources, wherein each of said second computational resources has a performance measure, wherein a minimum of performance measures of the second computational resources is used as a performance measure of the set of second computational resources, and wherein the set of second computational resources is a subset of the first computational resource, and wherein the performance of the first computational resource is the performance measure of the set of second computational resources.

Example 11 may include the method of any one of Examples 1 to 10, further including reporting the work fraction by one or more of an application or an Application Programming Interface (API).

Example 12 may include the method of any one of Examples 1 to 11, wherein at least a portion of the plurality of computational resources are in communication with one another.

Example 13 may include the method of any one of Examples 1 to 12, wherein the plurality of computational resources includes a plurality of groups of cores, and wherein the method further includes measuring an operating characteristic of at least one group of the plurality of groups of cores, and modifying a speed of at least one of the groups of cores based on the measurement.

Example 14 may include the method of any one of Examples 1 to 13, wherein the operating characteristic is speed, and wherein the method further includes increasing a speed of a first group of cores by increasing an amount of power supplied to the first group of cores, and decreasing a speed of a second group of cores by decreasing the amount of power supplied to the second group of cores.

Example 15 may include the method of any one of Examples 1 to 14, further including synchronizing the plurality of tasks at a barrier.

Example 16 may include the method of any one of Examples 1 to 15, wherein each task of the plurality of tasks includes a waiting time at the barrier, and wherein the method further includes repeatedly modifying the characteristic to reduce the waiting time for at least one task.

Example 17 may include the method of any one of Examples 1 to 16, wherein the groups of cores are nodes, and wherein the method further includes calculating a skew of a plurality of measurements of an operating characteristic for a plurality of nodes, and modifying a speed of at least one node based on the skew.

Example 18 may include an apparatus to process tasks, comprising a plurality of computational resources to process a plurality of tasks in parallel, wherein the plurality of tasks are to be globally synchronized across the plurality of computational resources, progress meter logic, implemented at least partly in fixed functionality hardware, to compute an amount of work to complete at least one task of the plurality of tasks, and repeatedly compute a work fraction that is to correspond to one or more of a fraction of work completed or work remaining to be completed with respect to the amount of work to complete the at least one task, and performance balancer logic, implemented at least partly in fixed functionality hardware, to modify a characteristic of at least one computational resource of the plurality of computational resources based on the work fraction.

Example 19 may include the apparatus of Example 18, wherein the plurality of computational resources is to include a plurality of cores, and wherein the performance balancer logic is to vary a frequency of at least one core of the plurality of cores based on the work function.

Example 20 may include the apparatus of any one of Examples 18 to 19, further including runtime monitor logic, implemented at least partly in fixed functionality hardware, to receive information from the progress meter logic indicative of the work fraction.

Example 21 may include the apparatus of any one of Examples 18 to 20, wherein the performance balancer logic is to vary a speed of at least one of the plurality of computational resources by varying an amount of power supplied to the at least one of the plurality of computational resources.

Example 22 may include the apparatus of any one of Examples 18 to 21, wherein the performance balancer logic is to vary a speed of at least two of the plurality of computational resources by steering power from a relatively faster one of the plurality of computational resources toward a relatively slower one of the plurality of computational resources.

Example 23 may include the apparatus of any one of Examples 18 to 22, wherein the computational resources are to include a plurality of cores, and wherein performance balancer logic is to vary a frequency of at least one of the plurality of cores by varying an amount of power provided to at least one of the cores.

Example 24 may include the apparatus of any one of Examples 18 to 23, wherein the plurality of computational resources are to include one or more of a core, a processor, a multi-core processor, a node, a cabinet, a cluster, a row, or a grid, and wherein at least a portion of the plurality of computational resources are to have a communications channel therebetween.

Example 25 may include the apparatus of any one of Examples 18 to 24, further including a plurality of nodes, and skew calculator logic to compute a skew of a plurality of measurements taken from the plurality of nodes, wherein the performance balancer logic is to vary a speed of at least one of the nodes based on the skew.

Example 26 may include the apparatus of any one of Examples 18 to 25, wherein the performance balancer logic is to modify one or more of a number, a distribution, a speed, or a frequency of at least one of the plurality of computational resources.

Example 27 may include at least one computer readable storage medium comprising one or more instructions that when executed on a computing device cause the computing device to globally synchronize a plurality of tasks across a plurality of computational resources, compute an amount of work to complete at least one task of the plurality of tasks, repeatedly compute a work fraction that corresponds to one or more of a fraction of work completed or work remaining to be completed with respect to the amount of work to complete the at least one task of the plurality of tasks, and modify a characteristic of at least one computational resource of the plurality of computational resources based on the work fraction.

Example 28 may include the at least one computer readable storage medium of Example 27, wherein the plurality of computational resources is to include a plurality of cores, and wherein the instructions, when executed on a computing device, cause a performance balancer to vary a frequency of at least one of the plurality of cores.

Example 29 may include the at least one computer readable storage medium of any one of Examples 27 to 28, wherein the instructions, when executed on a computing device, cause the computing device to compute the work fraction, and receive information from the progress meter indicative of the work fraction.

Example 30 may include the at least one computer readable storage medium of any one of Examples 27 to 29, wherein the instructions, when executed, cause the computing device to vary a characteristic of operation of at least one computational resource of the plurality of computational resources.

Example 31 may include the at least one computer readable storage medium of any one of Examples 27 to 30, wherein the instructions, when executed, cause the computing device to vary an amount of power provided to at least one of the plurality of cores.

Example 32 may include the at least one computer readable storage medium of any one of Examples 27 to 31, wherein the instructions, when executed, cause the computing device to allow the plurality of tasks to synchronize at a barrier.

Example 33 may include the at least one computer readable storage medium of any one of Examples 27 to 32, wherein each task of the plurality of tasks includes a waiting time at the barrier, and wherein the instructions, when executed, cause the computing device to repeatedly modify the characteristic to reduce a waiting time for at least one task.

Example 34 may include an apparatus for controlling computational resources, comprising means for globally synchronizing a plurality of tasks across a plurality of computational resources, means for computing an amount of work to complete at least one task of the plurality of tasks, means for processing the plurality of tasks in parallel to accomplish work corresponding to each task of the plurality of tasks, means for repeatedly computing a work fraction that corresponds to one or more of a fraction of work completed or work remaining to be completed with respect to the amount of work to complete the at least one task of the plurality of tasks, and means for modifying a characteristic of at least one computational resource of the plurality of computational resources based on the work fraction.

Example 35 may include the apparatus of Example 34, wherein the plurality of computational resources includes a plurality of cores, and wherein a frequency of at least one core of the plurality of cores is varied based on the work fraction.

Example 36 may include the apparatus of any one of Examples 34 to 35, wherein the plurality of computational resources includes a plurality of processors, and wherein a frequency of at least one core of the plurality of processors is varied based on the work fraction.

Example 37 may include the apparatus of any one of Examples 34 to 36, wherein the plurality of computational resources includes a plurality of nodes, and wherein at least two nodes of the plurality nodes process parallel code.

Example 38 may include the apparatus of any one of Examples 34 to 37, wherein the plurality of tasks includes a plurality of threads, and wherein the plurality of computational resources includes a plurality of cores.

Example 39 may include the apparatus of any one of Examples 34 to 38, further including means for receiving an indication of the work fraction at a runtime monitor.

Example 40 may include the apparatus of any one of Examples 34 to 39, further including means for varying one or more of a number, a distribution, a speed, or a frequency of at least one of the plurality of computational resources.

Example 41 may include the apparatus of any one of Examples 34 to 40, wherein the characteristic includes a speed, and wherein the speed of at least one computational resource of the plurality of computational resources is varied by changing an amount of electrical power provided to the at least one computational resource.

Example 42 may include the apparatus of any one of Examples 34 to 41, wherein the plurality of computational resources include one or more of a core, a processor, a multi-core processor, a node, a cabinet, a cluster, a row, or a grid.

Example 43 may include the apparatus of any one of Examples 34 to 42, wherein the plurality of computational resources are in communication with one another.

Example 44 may include the apparatus of any one of Examples 34 to 43, wherein the plurality of computational resources includes groups of cores, and wherein the apparatus further includes means for determining a measurement of an operating characteristic of at least one group of the groups of cores, and means for modifying a speed of at least one group of the groups of cores based on the measurement.

Example 45 may include the apparatus of any one of Examples 34 to 44, wherein the groups of cores are nodes, and wherein the apparatus further includes means for calculating a skew of a plurality of measurements of an operating characteristic for a plurality of nodes, and means for modifying a speed of at least one node based on the skew.

Example 46 may include an apparatus for balancing a plurality of computational resources, comprising a plurality of nodes, each node having a progress meter capable of determining progress information including a total amount of work to be done to complete a task and an amount of work that has been done to complete the task, and a performance balancer that uses the progress information to control the behavior of the plurality of nodes.

Example 47 may include the apparatus Example 46, further including a run-time monitor to obtain the progress information and forward the progress information to the performance balancer.

Example 48 may include the apparatus of any one of Examples 46 to 47, wherein the run-time monitor obtains the progress information via one or more of an explicit function call or a query by the run-time monitor.

Example 49 may include the apparatus of any one of Examples 46 to 48, wherein the run-time monitor includes an application programming interface (API).

Example 50 may include the apparatus of any one of Examples 46 to 49, wherein the performance balancer is to balance the plurality of nodes by speeding up a first portion of the plurality of nodes and by slowing down a second portion of the plurality of nodes.

Example 51 may include the apparatus of any one of Examples 46 to 50, wherein the performance balancer is to increase an amount of electrical power supplied to a portion of the plurality of nodes to speed up the portion of the plurality of nodes.

Example 52 may include the apparatus of any one of Examples 46 to 51, wherein the performance balancer is to reduce an amount of electrical power supplied to a portion of the plurality of nodes to slow down the portion of the plurality of nodes.

Example 53 may include a method of controlling computational resources, comprising globally synchronizing a plurality of threads across a plurality of computational resources, making one or more determinations of an extent to which a thread has been processed, and computing amounts of work to complete each thread of the plurality of threads, wherein the one or more determinations are used to control at least one computational resource of the plurality of computational resources.

Example 54 may include the method of Example 53, wherein the computational resources include cores.

Example 55 may include the method of any one of Examples 53 to 54, wherein the computational resources include nodes.

Example 56 may include the method of any one of Examples 53 to 55, wherein the computational resources include cabinets.

Example 57 may include the method of any one of Examples 53 to 56, wherein the computational resources include clusters.

Example 58 may include the method of any one of Examples 53 to 57, wherein the computational resources include grids.

Example 59 may include a method of enhancing operating efficiency of a plurality of computational resources, comprising globally synchronizing a plurality of threads across a plurality of cores, computing an amount of work to complete each thread of the plurality of threads, processing the plurality of threads in parallel to accomplish work corresponding to each thread of the plurality of threads, repeatedly computing a work fraction that corresponds to a fraction of work completed or remaining to be completed with respect to the amount of work to complete each thread of the plurality of threads, and modifying a core frequency of at least one core of the plurality of cores based on the work fraction.

Example 60 may include the method of Example 59, wherein the cores are grouped into nodes.

Example 61 may include the method of any one of Examples 59 to 60, wherein the nodes are grouped into cabinets.

Thus, techniques and structures described herein may reduce power consumption in a graphics processor, and are applicable to other types of processors as well. As a result, a graphics processor and/or other types of processors in which these techniques and structures are used may provide relatively higher energy efficiency.

Various embodiments and various modules may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Example sizes/models/values/ranges may have been given, although embodiments are not limited to the same. As manufacturing techniques mature over time, it may be expected that devices of smaller size and smaller tactile element size could be manufactured. In addition, well known electrical or fluidic components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment may be to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description may be thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it may be understood that the indefinite articles "a" or "an" carries the meaning of "one or more" or "at least one". As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method of controlling a computational resource, comprising:
    globally synchronizing a plurality of tasks across a plurality of computational resources;
    computing an amount of work to complete at least one task of the plurality of tasks;
    processing the plurality of tasks in parallel to accomplish work corresponding to each task of the plurality of tasks;
    repeatedly computing a work fraction that corresponds to one or more of a fraction of work completed or work remaining to be completed with respect to the amount of work to complete the at least one task of the plurality of tasks;
    calculating a skew of a plurality of work fractions taken from the plurality of computational resources, wherein the skew is a variance of the work fractions divided by a mean of the work fractions; and
    modifying a characteristic of at least one computational resource of the plurality of computational resources based on the work fraction and the skew.

2. The method of claim 1, wherein the plurality of computational resources includes a plurality of cores, and wherein a frequency of at least one core of the plurality of cores is varied based on the work fraction.

3. The method of claim 1, wherein the plurality of computational resources includes one or more of a core, a processor, a multi-core processor, a node, a cabinet, a cluster, a row, or a grid, and wherein at least a portion of the plurality of computational resources are in communication with one another.

4. The method of claim 1, wherein the plurality of tasks includes a plurality of threads, and wherein the plurality of computational resources includes a plurality of cores.

5. The method of claim 1, further including: reporting the work fraction by one or more of an application or an Application Programing Interface (API); and receiving an indication of the work fraction at a runtime monitor.

6. The method of claim 1, further including modifying one or more of a number, a distribution, a speed, or a frequency of at least one of the plurality of computational resources.

7. The method of claim 1, wherein the characteristic includes a speed, and wherein the speed of at least one computational resource of the plurality of computational resources is modified by changing an amount of electrical power provided to the at least one computation resource.

8. The method of claim 1, wherein the plurality of computational resources incudes a plurality of nodes.

9. The method of claim 1, further including synchronizing the plurality of tasks at a barrier, wherein each task of the plurality of tasks includes a waiting time at the barrier, and wherein the method further includes repeatedly modifying the characteristic to reduce the waiting time for the at least one task.

10. An apparatus to process tasks, comprising:
    a plurality of computational resources to process a plurality of tasks in parallel, wherein the plurality of tasks are to be globally synchronized across the plurality of computational resources;
    progress meter logic, implemented at least partly in fixed functionality hardware, to:
        compute an amount of work to complete at least one task of the plurality of tasks; and
        repeatedly compute a work fraction that is to correspond to one or more of a fraction of work completed or work remaining to be completed with respect to the amount of work to complete the at least one task;
    skew calculator logic to compute a skew of a plurality of work fractions taken from the plurality of computational resources, wherein the skew is a variance of the work fractions divided by a mean of the work fractions; and performance balancer logic, implemented at least partly in fixed functionality hardware, to modify a characteristic of at least one computational resource of the plurality of computational resources based on the work fraction and the skew.

11. The apparatus of claim 10, wherein the plurality of computational resources is to include a plurality of cores, and wherein the performance balancer logic is to vary a frequency of at least one core of the plurality of cores based on the work fraction.

12. The apparatus of claim 10, wherein the performance balancer logic is to vary a speed of at least one of the plurality of computational resources by varying an amount of power supplied to the at least one of the plurality of computational resources.

13. The apparatus of claim 10, wherein the performance balancer logic is to vary a speed of at least two of the plurality of computational resources by steering power from a relatively faster one of the plurality of computational resources toward a relatively slower one of the plurality of computational resources.

14. The apparatus of claim 10, wherein the computational resources are to include a plurality of cores, and wherein the performance balancer logic is to vary a speed of at least one of the plurality of cores by varying an amount of power provided to the at least one of the plurality of cores.

15. The apparatus of claim 10, further including runtime monitor logic, implemented at least partly in fixed functionality hardware, to receive information from the progress meter logic that is to be indicative of the work fraction.

16. The apparatus of claim 10, wherein the plurality of computational resources are to include one or more of a core, a processor, a multi-core processor, a node, a cabinet, a cluster, a row, or a grid, and wherein at least a portion of the plurality of computational resources are to have a communications channel there between.

17. The apparatus of claim 10, wherein the plurality of computational resources incudes a plurality of nodes.

18. The apparatus of claim 10, wherein the performance balancer logic is to modify one or more of a number, a distribution, a speed, or a frequency of at least one of the plurality of computational resources.

19. At least one non-transitory computer readable storage medium comprising one or more instructions that when executed on a computing device cause the computing device to:
globally synchronize a plurality of tasks across a plurality of computational resources;
compute an amount of work to complete at least one task of the plurality of tasks;
process the plurality of tasks in parallel to accomplish work corresponding to each task of the plurality of tasks;
repeatedly compute a work fraction that corresponds to one or more of a fraction of work completed or work remaining to be completed with respect to the amount of work to complete the at least one task of the plurality of tasks;
calculate a skew of a plurality of work fractions taken from the plurality of computational resources, wherein the skew is a variance of the work fractions divided by a mean of the work fractions; and
modify a characteristic of at least one computational resource of the plurality of computational resources based on the work fraction and the skew.

20. The at least one non-transitory computer readable storage medium of claim 19, wherein the plurality of computational resources is to include a plurality of cores, and wherein the instructions, when executed on a computing device, cause the computing device to modify a frequency of at least one of the plurality of cores.

21. The at least one non-transitory computer readable storage medium of claim 19, wherein the instructions, when executed, cause the computing device to: compute the work fraction; and
receive information from the progress meter indicative of the work fraction.

22. The at least one non-transitory computer readable storage medium of claim 19, wherein the instructions, when executed, cause the computing device to vary a characteristic of operation of at least one computational resource of the plurality of computational resources.

23. The at least one non-transitory computer readable storage medium of claim 19, wherein the instructions, when executed, cause the computing device to vary an amount of power provided to at least one core of the plurality of cores.

24. The at least one non-transitory computer readable storage medium of claim 19, wherein the instructions, when executed, cause the computing device to allow the plurality of tasks to synchronize at a barrier.

25. The at least one non-transitory computer readable storage medium of claim 19, wherein each task of the plurality of tasks includes a waiting time at the barrier, and wherein the instructions, when executed, cause the computing device to repeatedly modify the characteristic to reduce a waiting time for at least one task.

* * * * *